Jan. 27, 1931.    C. S. BENNINGTON    1,790,456
ARTIFICIAL BAIT OR LURE
Filed March 19, 1928

INVENTOR
Charles S. Bennington
By W. W. Williamson
Atty.

Patented Jan. 27, 1931

1,790,456

UNITED STATES PATENT OFFICE

CHARLES S. BENNINGTON, OF PEN ARGYL, PENNSYLVANIA

ARTIFICIAL BAIT OR LURE

Application filed March 19, 1928. Serial No. 262,611.

My invention relates to new and useful improvements in an artificial fish bait or lure and has for its primary object to provide such an article consisting of a spinner followed by a spoon to the rear of which is a fly or feathered hooks.

Another object of my invention is to construct a bait or lure in which the parts are so assembled relative to each other that when the device is in use it will resemble a living thing such as a bug the spinner simulating the head the spoon simulating the abdomen or said abdomen and posterior legs.

A further object of my invention is to combine a spinner, spoon and fly or feathered hooks to produce a unitary artificial bait or lure which will attract a fish because of the life-like movements reproduced when the device is traveling through water.

With these ends in view, this invention consists in the details of construction and combination of elements hereinafter set forth and then specifically designated by the claims.

In order that those skilled in the art to which this invention appertains may understand how to make and use the same I will describe its construction in detail, referring by numerals to the accompanying drawings forming a part of this application, in which:—

Figure 1:
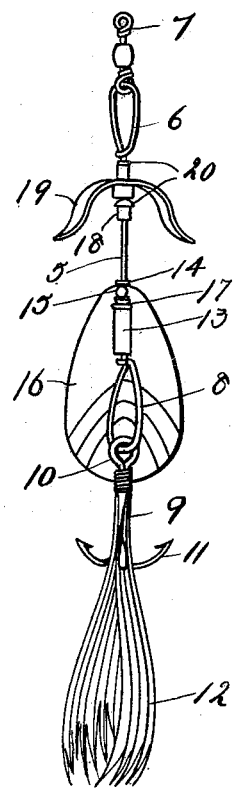
Fig. 1, is an elevation of the artificial fish bait or lure constructed in accordance with my invention.

In carrying out my invention as herein embodied, 5 represents the body wire having a loop 6 at one end to which the swivel 7 is connected and provided at the other end with a second loop 8 by which the fly or feathered hooks 9 are attached to said body wire through the medium of the eye 10 on the hook or hooks 11, hereinafter called a snare. In addition to the snare, the fly includes feathers 12 or equivalent disguising means, secured in the usual manner to hook shank.

On the body wire ahead of the rear loop 8 is mounted a tubular spacer 13 which positions the shackle 14 relative to said rear loop and more particularly relatively to the fly, for a purpose to be presently described. The shackle is U-shaped with a ball 15 located between its arms but mounted on the body wire 5. Said shackle has a spoon 16 loosely connected at one end to said shackle so that said spoon may swing outward relative to the body wire while rotating about the latter through the medium of the shackle. In order to reduce any friction between the shackle 14 and the spacer 13 to a minimum, a washer or washers 17 may be placed on the body wire between the spacer 13 and the shackle 14.

The shackle 14 is also slidable on the body wire between the spacer 13 or the washers 17 associated therewith and a fixed collar 18 of heavy material, such as lead, to weight the forward or head end of the lure.

A spinner 19 of propeller-like formation is revolubly mounted on the body wire between the collar 18, and the forward loop 6 and is adapted to revolve about the body wire as the lure travels through the water and if found desirable washers 20 may be placed on said body wire between the collar 18 and one end of the spinner and the loop 6 and the other end of said spinner.

Figure 2:
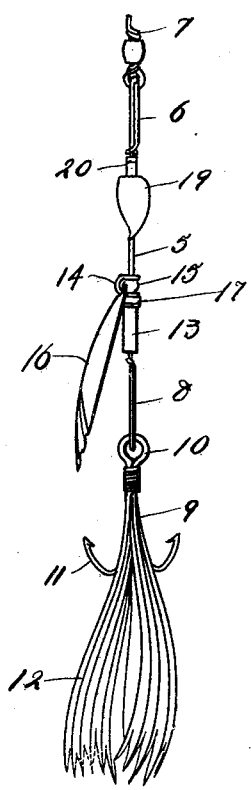
Fig. 2, is a similar view at right angles to Fig. 1.

In actual practice when the lure is traveling through the water, of course being drawn by a fishing line attached to the swivel 7, the spoon 16 assumes a position at an angle to the body somewhat similar to that shown in Fig. 2, and as it revolves about the body wire, light rays will be so reflected that said spoon will resemble the thorax of a bug or insect. At the same time the spinner 19 revolves and in the same manner produces an imitation of an insect head while the fly 9 gives to the lure the resemblance of an insect's abdomen and posterior legs.

All of these elements are combined to bring about the appearance of a live thing, such as an insect, which will lure fish to strike or bite at it as though it was a choice morsel of fish food.

Of course I do not wish to be limited to the exact details of construction as herein shown, as these may be varied within the limits of the appended claims without departing from the spirit of my invention.

Having thus fully described my invention, what I claim as new and useful is:—

1. An artificial fish bait or lure comprising, in combination, a supporting element, a head spinner revolubly mounted on said supporting element, a spoon also revolubly mounted on said supporting element, and a fly including a snare.

2. An artificial lure comprising a fly, a spoon revolubly mounted ahead of the fly, and a spinner revolubly mounted ahead of said spoon.

3. A lure consisting of a body wire, a feathered snare attached to one end of said body wire, a spoon revolubly mounted on the body wire ahead of the snare and having a swinging movement relative to said body wire, and a spinner journalled on the body wire ahead of the spoon.

4. An artificial bait comprising, in combination, a body, a loop at each end of said body, a fly including a snare attached to one of said loops, a tubular spacer mounted on the body and having one end coacting with the loop to which the fly is attached, a collar fixed on the body in spaced relation to the spacer when the latter is adjacent the fly carrying loop, a shackle slidably and revolubly mounted on the body between the spacer and collar, a spoon of concavo-convex formation loosely attached at one end of said shackle for swinging movement relative to the body, a spinner revolubly mounted on said body between the collar and the other loop, and a swivel attached to said other loop.

5. An artificial lure comprising a body member, a fly at the rear end of the body member, a spoon revolubly connected by one of its ends to the body member ahead of the fly while the other end is free to swing outward as said spoon revolves, and a spinner revolubly mounted midway its ends upon the body member ahead of the spoon.

6. An artificial lure comprising a body wire, a fly, a member revolubly mounted at its forward end only on said body wire so that the free end may assume various positions different distances from the body wire, and another member revolubly mounted intermediate its ends on said body wire forward of the first mentioned member.

In testimony whereof, I have hereunto affixed my signature.

CHARLES S. BENNINGTON.